(No Model.) 2 Sheets—Sheet 1.
E. J. MUYBRIDGE.
METHOD OF AND APPARATUS FOR PHOTOGRAPHING CHANGING OR MOVING OBJECTS.
No. 279,878. Patented June 19, 1883.
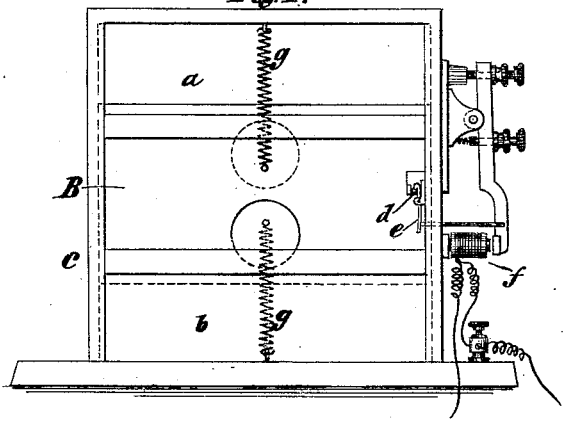
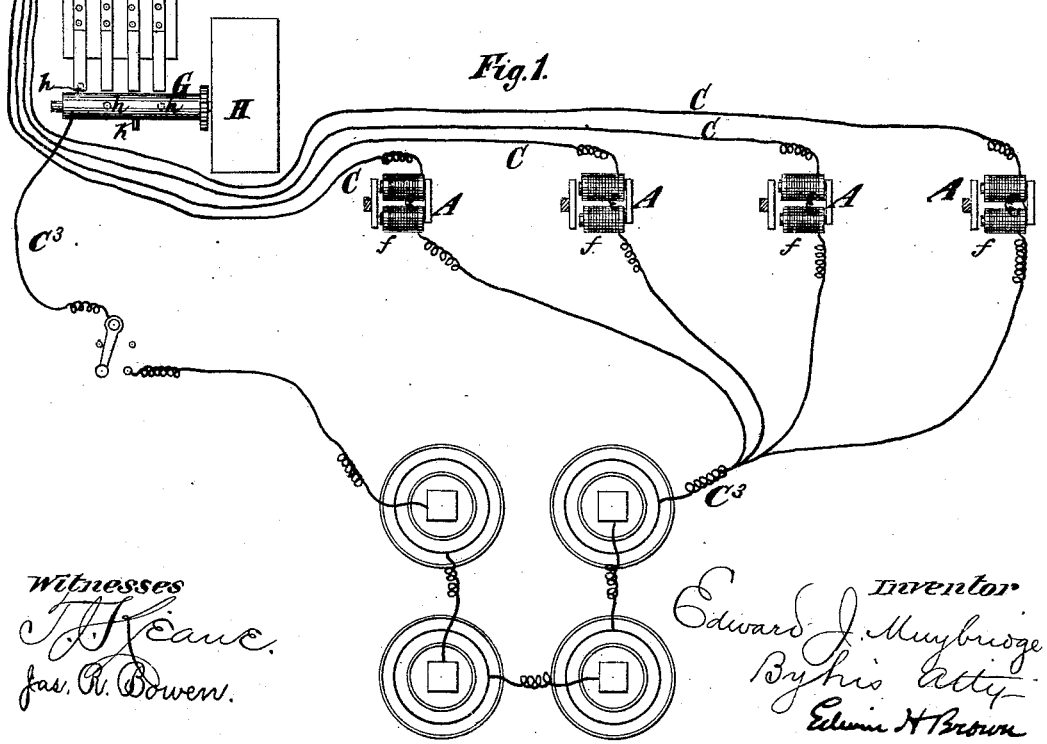
Witnesses
T. H. Keane.
Jas. R. Bowen.
Inventor
Edward J. Muybridge
By his Atty
Edwin H. Brown
N. PETERS, Photo-Lithographer, Washington, D. C.

(No Model.) 2 Sheets—Sheet 2.
E. J. MUYBRIDGE.
METHOD OF AND APPARATUS FOR PHOTOGRAPHING CHANGING OR MOVING OBJECTS.

No. 279,878. Patented June 19, 1883.

UNITED STATES PATENT OFFICE.

EDWARD J. MUYBRIDGE, OF SAN FRANCISCO, CALIFORNIA.

METHOD OF AND APPARATUS FOR PHOTOGRAPHING CHANGING OR MOVING OBJECTS.

SPECIFICATION forming part of Letters Patent No. 279,878, dated June 19, 1883.

Application filed August 31, 1881. Renewed April 19, 1883. (No model.)

*To all whom it may concern:*

Be it known that I, EDWARD J. MUYBRIDGE, of San Francisco, in the county of San Francisco and State of California, have invented certain new and useful Improvements in the Method of and Apparatus for Photographing Changing or Moving Objects, of which the following is a specification.

The object of these improvements is to provide for effectually photographing changing or moving bodies in their different phases or positions.

In carrying out my invention a number of photographic cameras provided with sensitized plates are placed at different points whence views of the object may be had. Each camera has combined with it a shutter which excludes light from the lens-tube save at the proper time. A motor—such, for instance, as clockwork—driven by a spring or weight, when started by the hand of the photographer or otherwise, serves to operate the shutters of the cameras to expose the sensitized plates in the cameras for periods more or less brief. It operates the shutters through the agency of electric circuits and appurtenances, and it may operate the shutters of the cameras successively or more or less of them together.

Figure 3:
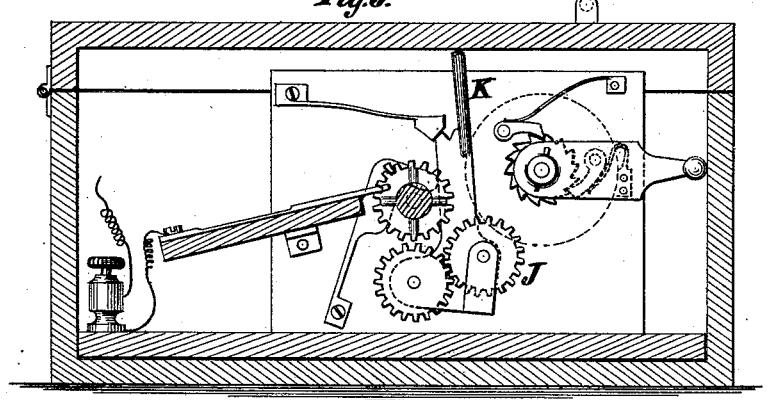
Figure 2:
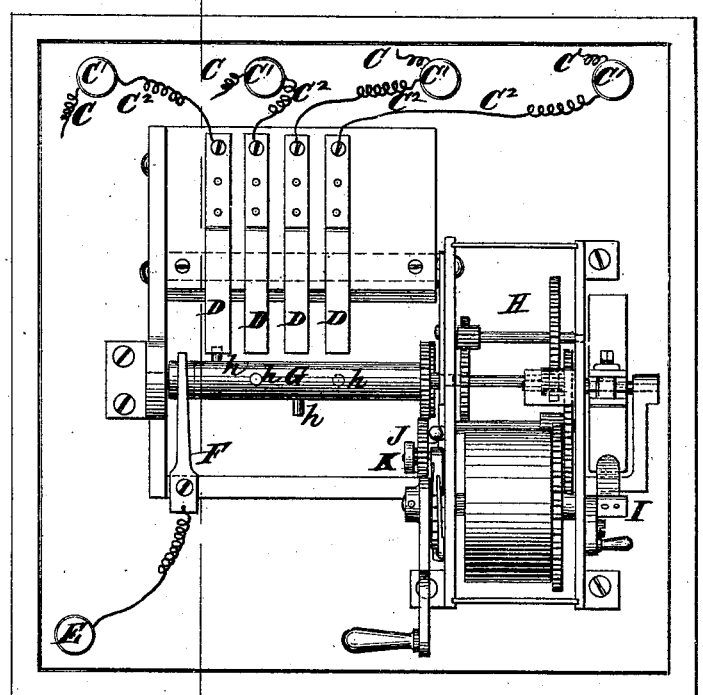

In the accompanying drawings, Figure 1 is a plan illustrating a number of cameras, electric circuits for operating their shutters, and a circuit-closer for said circuits, and a motor for operating the circuit-closer, no attention being given to the relative sizes of these different devices. Fig. 2 is a plan of the circuit-closer and the motor for operating it, on a larger scale. Fig. 3 is a vertical section of the same; and Fig. 4 is a back view of the shutter of one of the cameras and certain appurtenances, on a larger scale.

Similar letters of reference designate corresponding parts in all the figures.

A designates the portions occupied by a number of photographic cameras designed to operate successively on an object. While I have only shown four, I desire it to be particularly understood that I may use any suitable number. Each camera is provided with a shutter, B. Such shutter consists of two slides, *a b*, arranged in a frame, *c*, in front of the lens-tube of the camera. These slides have openings through them, and when the openings are coincident with each other they are opposite the lens-tube of the camera. The slides are set so as to exclude light from the lens-tube, and for this purpose the slide *a* is moved upward and the slide *b* is moved downward. They are retained in this position by a lever, *d*, which is pivoted to one and engages with the other. A trigger or catch, *e*, locks this lever in position, and is connected with an electro-magnet, *f*, whereby it may be made to release the lever and consequently allow the slides to change their positions. The electro-magnet is in an electric circuit which will presently be described. When the slides are released they are drawn past each other by springs *g*, and, in passing, their openings coincide opposite the lens-tube of the camera, and for a period more or less brief expose a sensitized plate in the camera, and after they pass far enough to bring their openings out of line the light is again excluded from the camera. I do not confine myself to the use of the particular kind of shutter which I have described, as various others will be equally suitable for my purpose.

C designates electric-circuit wires which severally extend from the electro-magnets *f* of each camera to binding-posts C', which are connected by wires $C^2$ with terminals D. The electro-magnets *f* are also connected to a common return-wire, $C^3$, forming part of each electric circuit. This return-wire is connected to a binding-post, E, which in turn is connected to a metallic finger, F, bearing on a metallic cylinder, G. This cylinder is provided with metallic projections *h*, which make contact with the terminals D as the cylinder rotates, and thus closes the several electric circuits. The projections *h* are arranged in such position as to operate successively upon the terminals D, which are respectively in the same plane with them. As the cylinder G rotates and the electric circuits are successively closed by it, the electro-magnets *f* are energized and effect the release of the shutters of the several cameras, one after another, making exposures of the sensitized plates therein. Other forms of circuit-closers may be used, or closed circuits may be used, and circuit-breakers may be used. In the latter case the electro-magnets *f* would release the triggers, and springs would be employed to actuate the latter.

H designates a motor whereby the circuit-closer cylinder G is rotated. As here shown it consists of clock-work impelled by a spring and retarded by a fan. It may, however, be of any suitable construction, and when made of clock-work it may be impelled by a weight, and may be retarded by any suitable device in lieu of a fan—as, for instance, an ordinary escapement. The motor is connected to the circuit-closer cylinder by gear-wheels J, which, by means of a lever, K, may be engaged with or disengaged from the said cylinder at will. The motor is shown provided with an adjustable stop consisting of a lever, I, which can be shifted to obtrude itself in the way of the fan of the motor, and thus stop the motor. This stop can be operated by hand or otherwise.

It will be seen that by my improvements I provide for photographing a moving object—such as a horse or other living creature—in the different positions it assumes, or a changing object, such as an exploding torpedo, or blasting rock in its different phases.

Where the improvements are employed in photographing a moving object, the object may be made to start the motor by coming in contact with a thread crossing its path of motion and connected with the stop of the motor.

Where the improvements are employed to photograph a changing body—such as an exploding torpedo or blasting rock—the electric current which fires the charge may effect the release of the stop of the motor to cause the latter to operate; but in such case the circuit-closing cylinder will preferably be so constructed as to make one or two rotations before operating on any of the terminals, so as to give time for the fuses which are ignited by the electric current to transmit fire to the explosive charge before the shutter of any camera is operated.

What I claim as my invention, and desire to secure by Letters Patent, is—

1. The process of photographing a changing or moving body in its different phases or positions, consisting in placing a number of photographic cameras provided with shutters at different points of view, and in operating the series of shutters by means of a motor common to all, substantially as specified.

2. The combination of a number of photographic cameras, shutters therefor, electric circuits and appurtenances for operating the shutters, and a motor for controlling the electric circuits, and thereby effecting the operation of the shutters for rendering the cameras operative at the desired time, substantially as specified.

3. The combination of a number of photographic cameras, shutters therefor, electric circuits and appurtenances for operating the shutters, a circuit closer or breaker, and a motor for actuating the circuit closer or breaker, and thereby effecting the operation of the shutters to render the cameras operative at the desired time, substantially as specified.

EDW. J. MUYBRIDGE.

Witnesses:
EDWIN H. BROWN,
T. J. KEANE.